(12) United States Patent
Kawasaki

(10) Patent No.: US 9,013,400 B2
(45) Date of Patent: Apr. 21, 2015

(54) PROJECTION SYSTEM, PROJECTION APPARATUS, SENSOR DEVICE, POWER GENERATION CONTROL METHOD, AND COMPUTER PROGRAM PRODUCT

(75) Inventor: Satoshi Kawasaki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 310 days.

(21) Appl. No.: 13/602,603

(22) Filed: Sep. 4, 2012

(65) Prior Publication Data

US 2013/0057466 A1 Mar. 7, 2013

(30) Foreign Application Priority Data

Sep. 5, 2011 (JP) ................................. 2011-193197
Aug. 24, 2012 (JP) ................................. 2012-185797

(51) Int. Cl.
G09G 5/00 (2006.01)
G03B 21/56 (2006.01)
H04N 9/31 (2006.01)
G06F 3/03 (2006.01)

(52) U.S. Cl.
CPC .............. *G03B 21/56* (2013.01); *H04N 9/3182* (2013.01); *H04N 9/3194* (2013.01); *G06F 3/0325* (2013.01)

(58) Field of Classification Search
CPC ........ G09G 5/00; G03B 21/56; G06F 3/0325; G06F 3/041; H04N 9/3182; H04N 9/3194
USPC .......... 345/156, 173, 204, 205; 348/744, 745, 348/E09.025, E09.027
See application file for complete search history.

(56) References Cited

U.S. PATENT DOCUMENTS

| | | | | | |
|---|---|---|---|---|---|
| 4,964,719 | A | * | 10/1990 | Tachikawa et al. | ............. 353/85 |
| 5,883,476 | A | * | 3/1999 | Noguchi et al. | ......... 315/368.12 |
| 5,907,437 | A | * | 5/1999 | Sprotbery et al. | ............ 359/618 |
| 6,239,424 | B1 | * | 5/2001 | Kuo | ............................. 250/221 |
| 6,340,976 | B1 | * | 1/2002 | Oguchi et al. | ................ 345/690 |
| 6,558,006 | B2 | * | 5/2003 | Ioka | ................ 353/94 |
| 6,606,130 | B1 | * | 8/2003 | George | ......................... 348/744 |
| 6,636,274 | B1 | * | 10/2003 | Mazda et al. | ................. 348/745 |

(Continued)

FOREIGN PATENT DOCUMENTS

| | | |
|---|---|---|
| CN | 1460918 A | 12/2003 |
| CN | 1983014 A | 6/2007 |

(Continued)

OTHER PUBLICATIONS

Extended Search Report issued Jan. 23, 2013 in European Patent Application No. 12182873.5.

(Continued)

*Primary Examiner* — Joe H Cheng
(74) *Attorney, Agent, or Firm* — Oblon, McClelland, Maier & Neustadt, L.L.P.

(57) ABSTRACT

A projection system includes a projector that projects an image onto a projection plane of a screen, and sensor units each including a photoelectric power generating unit that is installed at a predetermined position in an area in which an image is projected on the projection plane and that generates power corresponding to an intensity of projection light projected by the projector. The projector may include an image processing circuit that converts at least image data projected at the installation positions of the sensor units in image data projected on the projection plane into white image data or converts whole image data into white image data.

10 Claims, 16 Drawing Sheets

(56) References Cited

U.S. PATENT DOCUMENTS

| | | | |
|---|---|---|---|
| 6,972,807 B2 * | 12/2005 | Lee et al. | 348/745 |
| 7,457,035 B2 * | 11/2008 | Fricke et al. | 359/443 |
| 8,342,693 B2 * | 1/2013 | Wu et al. | 353/84 |
| 8,711,213 B2 * | 4/2014 | Furui | 348/135 |
| 2003/0156229 A1 * | 8/2003 | Samman et al. | 348/745 |
| 2003/0193566 A1 * | 10/2003 | Matsuda et al. | 348/189 |
| 2003/0214640 A1 * | 11/2003 | Kimura et al. | 353/122 |
| 2005/0094110 A1 | 5/2005 | Nakamura | |
| 2005/0219271 A1 * | 10/2005 | Tanaka | 345/690 |
| 2007/0091433 A1 * | 4/2007 | Garner et al. | 359/459 |
| 2008/0036995 A1 * | 2/2008 | Inoue | 356/5.01 |
| 2008/0136905 A1 * | 6/2008 | Shibue et al. | 348/94 |
| 2009/0201435 A1 * | 8/2009 | Yoshimi et al. | 349/1 |
| 2009/0207322 A1 | 8/2009 | Mizuuchi et al. | |
| 2010/0110387 A1 * | 5/2010 | Wendt | 353/29 |
| 2010/0265403 A1 * | 10/2010 | Hikosaka | 348/607 |
| 2011/0026038 A1 * | 2/2011 | Kiyose | 356/614 |
| 2011/0090192 A1 * | 4/2011 | Harris | 345/207 |
| 2011/0169854 A1 * | 7/2011 | Hikosaka | 345/589 |
| 2011/0304659 A1 * | 12/2011 | Lee et al. | 345/694 |

FOREIGN PATENT DOCUMENTS

| | | |
|---|---|---|
| EP | 1 178 454 A1 | 2/2002 |
| EP | 2 280 335 A2 | 2/2011 |
| JP | 11-327789 | 11/1999 |
| JP | 2008-076804 | 4/2008 |

OTHER PUBLICATIONS

Chinese Office Action issued Nov. 27, 2014, in China Patent Application No. 201210466114.6 (with English translation).

* cited by examiner

PROJECTION SYSTEM, PROJECTION APPARATUS, SENSOR DEVICE, POWER GENERATION CONTROL METHOD, AND COMPUTER PROGRAM PRODUCT

CROSS-REFERENCE TO RELATED APPLICATIONS

The present application claims priority to and incorporates by reference the entire contents of Japanese Patent Application No. 2011-193197 filed in Japan on Sep. 5, 2011 and Japanese Patent Application No. 2012-185797 filed in Japan on Aug. 24, 2012.

BACKGROUND OF THE INVENTION

1. Field of the Invention

The present invention relates to a projection system, a projection apparatus, a sensor device, a power generation control method, and a computer program product.

2. Description of the Related Art

In recent years, with the development of an information processing apparatus, such as a computer, it becomes possible to perform presentation by using a projector that projects an enlarged image of image data obtained from the information processing apparatus onto a projection plane in a separate location.

In such a projector, operation detection sensors, such as infrared sensors, are installed on the projection plane to detect operations that a user performs on an image on the projection plane (see, for example, Japanese Patent Application Laid-open No. 2008-76804).

The operation detection sensors, such as the infrared sensors, are installed, as a pair, at the both corners of one side of the projection plane and emit infrared toward the projection plane to enable the detection. When the infrared is uniformly applied to the projection plane with the aid of a reflection frame provided around the projection plane, and if a user touches the projection plane, infrared becomes undetectable at the touched position. The infrared sensors as a pair detect a position where the infrared is not detected on the projection plane by using a triangulation technology.

Therefore, the operation detection sensors need power to detect the operation position on the projection plane. Conventionally, a power cable is extended and connected from the projector to the operation detection sensors installed on the projection plane.

However, in the conventional technology described above, because the power cable for power supply to the operation detection sensors is extended from the projector to the projection plane that is separately located, the power cable becomes an obstacle. Besides, the power cable needs to be installed in addition to installing the projector and the projection plane. Therefore, there is a need for improvement to enhance the usability.

Therefore, there is a need to provide a projection system, a projection apparatus, a sensor device, a power generation control method, and a power generation control program capable of omitting a power cable connected to a sensor on a projection plane.

SUMMARY OF THE INVENTION

It is an object of the present invention to at least partially solve the problems in the conventional technology.

A projection system comprising: a projecting unit that projects an image onto a projection plane; and a photoelectric unit that is installed at a predetermined position in an area in which the image is projected on the projection plane and that generates power corresponding to an intensity of projection light projected by the projecting unit.

A projection apparatus used with a sensor device, the sensor device being installed at a predetermined position in an area in which an image is projected on a projection plane and including a photoelectric unit that generates power corresponding to an intensity of a projection light of the image projected at the predetermined position, the projection apparatus comprising: a projecting unit that projects an image onto the projection plane; and an image processing unit that converts at least image data projected at an installation position of the photoelectric unit in image data provided to the projecting unit into white image data or converts whole image data into white image data.

A sensor device used with a projection apparatus, the projection apparatus being configured to project an image onto a projection plane, the sensor device comprising: a photoelectric unit that is installed at a predetermined position in an area in which the image is projected on the projection plane and that generates power corresponding to an intensity of a projection light projected by a projecting unit; and a driving unit that operates by using the power generated by the photoelectric unit.

A power generation control method comprising: projecting an image onto a projection plane; generating, by a photoelectric unit that is installed at a predetermined position in an area in which the image is projected on the projection plane, power corresponding to an intensity of a projection light projected by a projecting unit; and converting including one of converting at least image data projected at an installation position of the photoelectric unit in image data projected at the projecting into white image data and converting whole image data into white image data.

A computer program product comprising a non-transitory computer-usable medium having computer-readable program codes of a power generation control program that enables a computer that projects an image onto a projection plane to cause a photoelectric unit installed at a predetermined position in an area in which an image is projected on the projection plane to generate power, wherein the program codes when executed causing the computer to execute: projecting an image onto the projection plane; and converting including one of converting at least image data projected at an installation position of the photoelectric unit in image data projected on the projection plane into white image data and converting whole image data into white image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. The embodiments described below are preferred embodiments of the present invention and various technically-preferred limitations are added. However, the present invention is not unreasonably limited by the explanation described below. Besides, not all components explained in the embodiments below are necessarily needed as the components of the present invention.

First Embodiment

Figure 1:
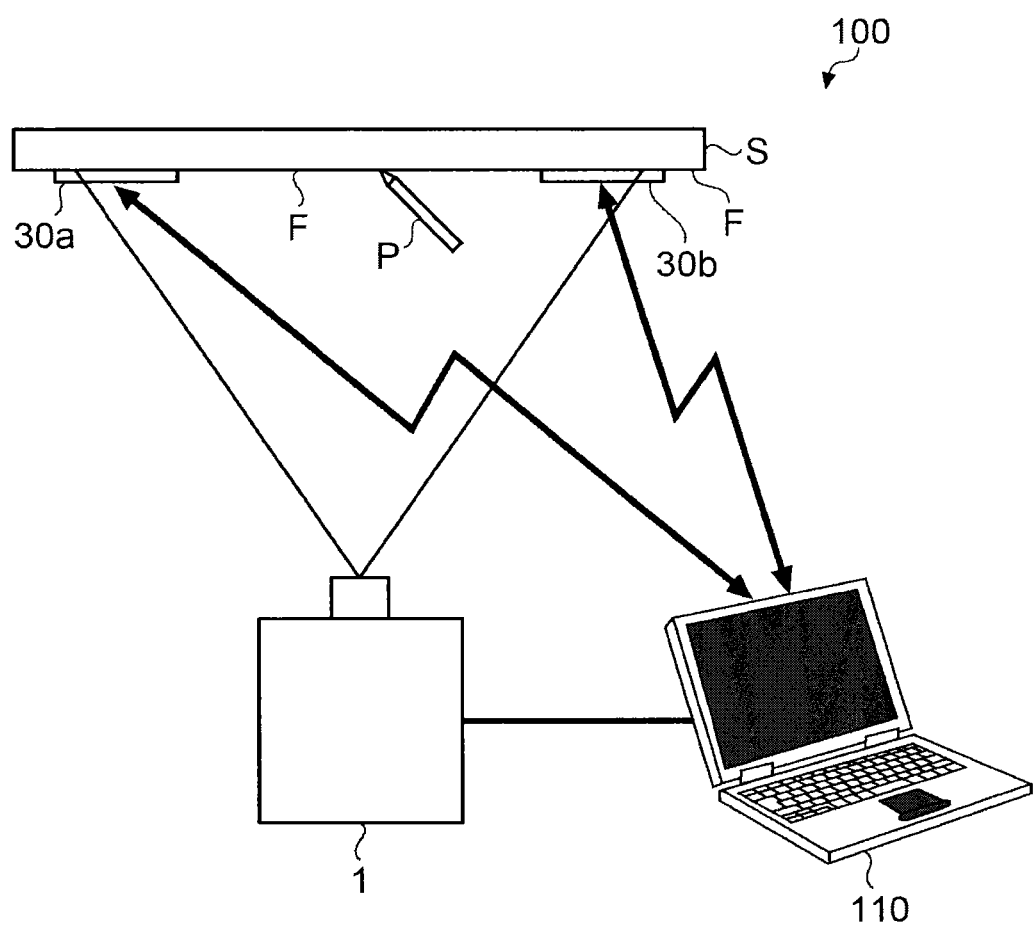
FIG. 1 is a schematic diagram illustrating an overall configuration of a projection system according to a first embodiment of the present invention.
Figure 2:
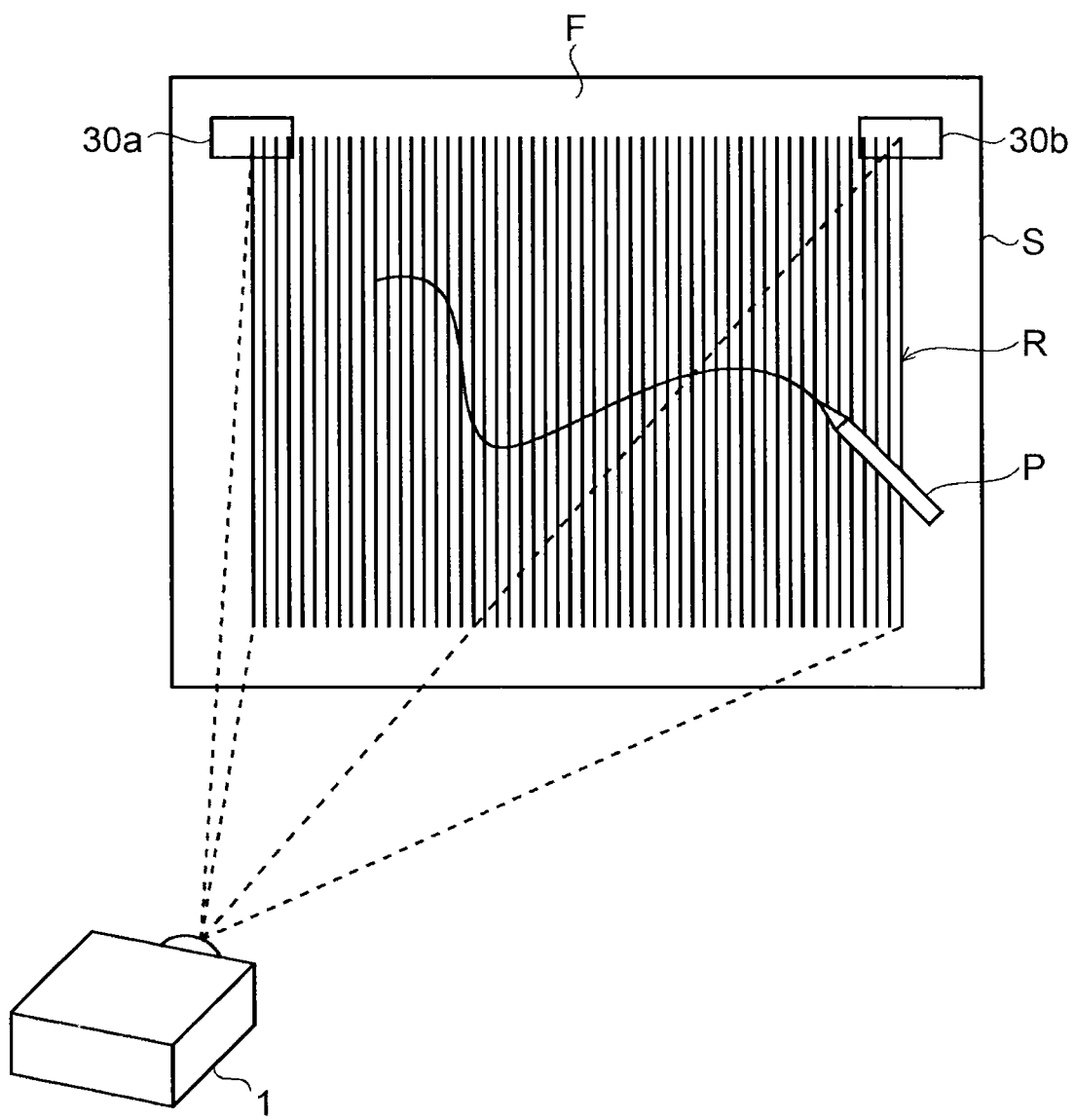
FIG. 2 is a perspective view illustrating a projection state of a projector to which the first embodiment of the present invention is applied.

FIG. 1 to FIG. 10 are diagrams illustrating a projection system, a projection apparatus, a sensor device, a power generation control method, and a power generation control program according to a first embodiment of the present invention. FIG. 1 is a schematic diagram illustrating an example of the projection system using a projector according to the first embodiment. FIG. 2 is a schematic diagram of the projector illustrated in FIG. 1 and a screen, which are viewed from a different angle.

As illustrated in FIG. 1, a projection system 100 according to the first embodiment includes a projector 1, a personal computer (PC) 110, and sensor units 30a and 30b. The projector 1 and the PC 110 are connected to each other via, for example, a RGB cable or a universal serial bus (USB) cable such that image data of an image to be projected on a screen S is input from the PC 110 to the projector 1. The two sensor units 30a and 30b installed on a projection plane F of the screen S are connected to the PC 110 via a wireless link. The wireless link may be a wireless local area network (LAN) or Bluetooth (registered trademark).

As illustrated in FIG. 1 and FIG. 2, the projector 1 projects an image while using the surface of the screen S installed at a position with a predetermined distance as the projection plane F. On the projection plane F of the screen S, the sensor units 30a and 30b are provided at both corners of the upper side of a projection area R in which an image from the projector 1 is projected. The sensor units 30a and 30b detect a position where an instruction operation using a pen P is performed on the image on the projection plane F.

Figure 3:
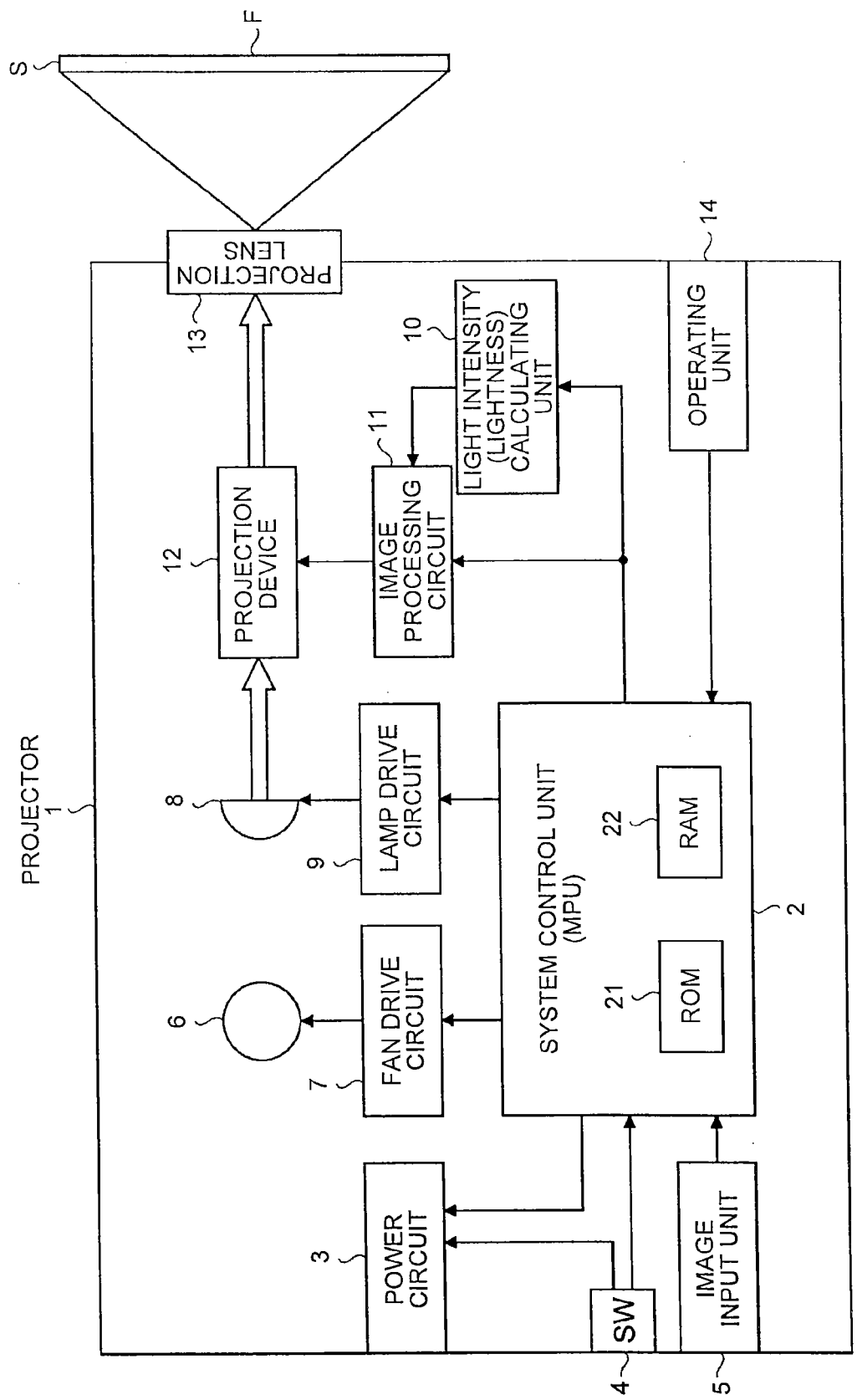
FIG. 3 is a block diagram of a configuration of the projector illustrated in FIG. 1.

The projector 1 has a block configuration as illustrated in FIG. 3, and includes a system control unit 2, a power circuit 3, a power switch (SW) 4, an image input unit 5, a cooling fan 6, a fan drive circuit 7, a projection lamp 8, a lamp drive circuit 9, a light intensity calculating unit 10, an image processing circuit 11, a projection device 12, a projection lens 13, and an operating unit 14.

The image input unit 5 is connected to the PC 110, receives image data transmitted from the PC 110, and outputs the image data to the system control unit 2. Any information processing apparatus, such as a computer or various video players, may be used instead of the PC 110.

The system control unit 2 is formed of a micro-processing unit (MPU) that includes a read only memory (ROM) 21 and a random access memory (RAM) 22. The system control unit 2 controls the units of the projector 1 based on a program and system data stored in the ROM 21 by using the RAM 22 as a working memory, to thereby execute a basic process and a sensor power control process according to the first embodiment.

Specifically, the projector 1 is configured as a projection apparatus that reads a sensor power control program for performing a sensor power control method according to the first embodiment from a computer-readable recording medium, such as a ROM, an electrically erasable and programmable read only memory (EEPROM), an erasable and programmable read only memory (EPROM), a flash memory, a flexible disk, a compact disc read only memory (CD-ROM), a compact disc rewritable (CD-RW), a digital versatile disc (DVD), a secure digital (SD) card, or a magneto-optical disc (MO), and introduces the sensor power control program into the RAM 22 or the like, to thereby perform the sensor power control method for efficiently ensuring power to the sensor units 30a and 30b to be described later. The sensor power control program is a computer-executable program written in a legacy programming language, such as an assembly language, C, C++, C#, or Java (registered trademark), or written in an object-oriented programming language, and may be distributed by being stored in the abovementioned recording medium or the like.

The power switch (SW) 4 is used by a user to give an instruction to turn on or off power to the projector 1. The power switch 4 outputs an on/off signal to the power circuit 3 and the system control unit 2.

A power code with a power plug is connected to the power circuit 3. When the power plug is inserted into a power socket of a commercial power source, alternating current (AC) of 100 volts is supplied from the commercial power source to the power circuit 3. When the power switch 4 is turned on while the AC of 100 volts is being supplied from the commercial power source, the power circuit 3 converts the voltage and the frequency of the current supplied from the commercial power source into a voltage and a frequency to be used by an internal circuit of the projector 1, and supplies the converted current as power to various units, such as the system control unit 2, the cooling fan 6, the projection lamp 8, and the projection device 12.

The fan drive circuit 7 controls drive of the cooling fan 6 under the control of the system control unit 2. The cooling fan 6 sends cool wind by being rotated by the fan drive circuit 7, thereby cooling various units including the projection lamp 8 in the projector 1.

The lamp drive circuit 9 controls on/off of the projection lamp 8 under the control of the system control unit 2. The projection lamp 8 applies projection light to the projection device 12 when turned on by the lamp drive circuit 9.

The projection device 12 modulates the projection light from the projection lamp 8 by a spatial light modulation system based on image data provided by the image processing circuit 11. The projection device 12 projects the modulated light onto the projection plane F of the screen S via the projection lens 13, so that an image is projected on the projection plane F of the screen S. The projection device 12 may be, for example, a liquid crystal panel or a digital micromirror device (DMD).

Image data that is input from the image input unit 5 and temporarily stored in the system control unit 2 is input to the image processing circuit 11. The image processing circuit 11 performs necessary image processing on the image data input from the system control unit 2 and outputs the image data to the projection device 12 under the control of the system control unit 2.

The system control unit 2 inputs the same image data as the image data input to the image processing circuit 11 to the light intensity calculating unit 10. The light intensity calculating unit 10 calculates the light intensity applied to the sensor units 30a and 30b based on image data which is projected at the positions corresponding to the sensor units 30a and 30b on the projection plane F in the input image data, and outputs, to the image processing circuit 11, a frame insertion signal for inserting a frame with a white image into the image data at the positions of the sensor units 30a and 30b. For example, the light intensity calculating unit 10 adds up RGB values of the lightness of the image data to obtain the light intensity. When it is necessary to increase the number of insertions of frames with white images per unit time in accordance with the calculated light intensity, the light intensity calculating unit 10 increases the number of insertions of frames with white images per unit time. On the other hand, when it is possible to decrease the number of insertions of frames with white images per unit time in accordance with the calculated light intensity, the light intensity calculating unit 10 decreases the number of insertions of frames with white images per unit time in order to prevent a projection image from becoming whitish. When it is not necessary to increase or decrease the number of insertions of frames with white images per unit time in accordance with the calculated light intensity, the light intensity calculating unit 10 maintains the current number of insertions of frames with white images per unit time. The case where the number of insertions of frames with white images per unit time needs to be increased is a case where an adequate amount of power needed to power the sensor units 30a and 30b is not producible by the light intensity of a projection image, which will be described later. The case where the number of insertions of frames with white images per unit time can be decreased is a case where an adequate amount of power needed to power the sensor units 30a and 30b is producible by the light intensity of the projected image, which will be described later.

The operating unit 14 includes various keys and buttons. The operating unit 14 receives various operations from a user, other than the operation of turning on or off the power of the projector 1. Examples of the various operations include an operation of adjusting the size of a projection image, an operation of adjusting color tone, an operation of adjusting focus, and an operation of adjusting keystone. The operating unit 14 outputs the contents of the received operations to the system control unit 2.

When the power switch 4 is turned on and the power is supplied from the power circuit 3 to the system control unit 2, the system control unit 2 becomes active according to a control program that is stored in advance in the ROM 21, and gives a control signal to the lamp drive circuit 9 to turn on the projection lamp 8 and a control signal to the fan drive circuit 7 to rotate the cooling fan 6 at a predetermined rated speed. When the power circuit 3 starts power supply, the projection device 12 is enabled to display images and power is supplied to various other components from the power circuit 3.

When the power switch 4 is turned off, the power switch 4 sends a power-off signal to the system control unit 2. Upon detecting the power-off signal, the system control unit 2 gives a control signal to the lamp drive circuit 9 to turn off the projection lamp 8. Thereafter, when a predetermined time elapses, the system control unit 2 gives a control signal to the fan drive circuit 7 to stop the cooling fan 6, terminates own control process by itself, and gives an instruction to the power circuit 3 to stop the power supply.

Figure 4:
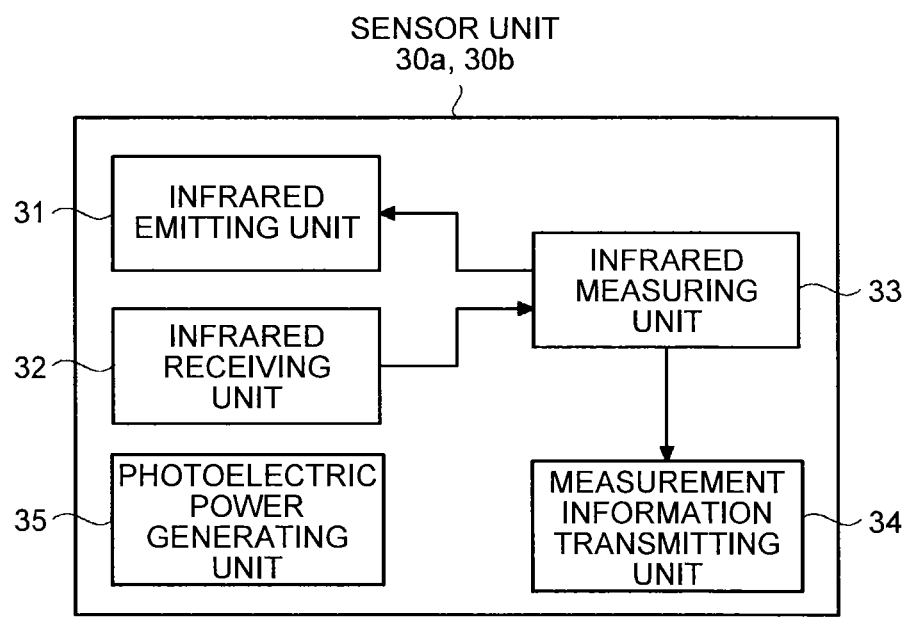
FIG. 4 is a block diagram of a configuration of a sensor unit illustrated in FIG. 1.

Each of the sensor units 30a and 30b has a block configuration as illustrated in FIG. 4, and includes an infrared emitting unit 31, an infrared receiving unit 32, an infrared measuring unit 33, a measurement information transmitting unit 34, and a photoelectric power generating unit 35.

The infrared emitting unit 31 emits infrared used for detecting an operation position onto the projection plane F of the screen S. A reflection frame (not illustrated) for reflecting infrared is installed at the positions of all sides of the projection area R except for the side where the sensor units 30a and 30b are installed on the projection plane F of the screen S, so that the infrared emitted by the infrared emitting unit 31 is reflected.

Figure 5:
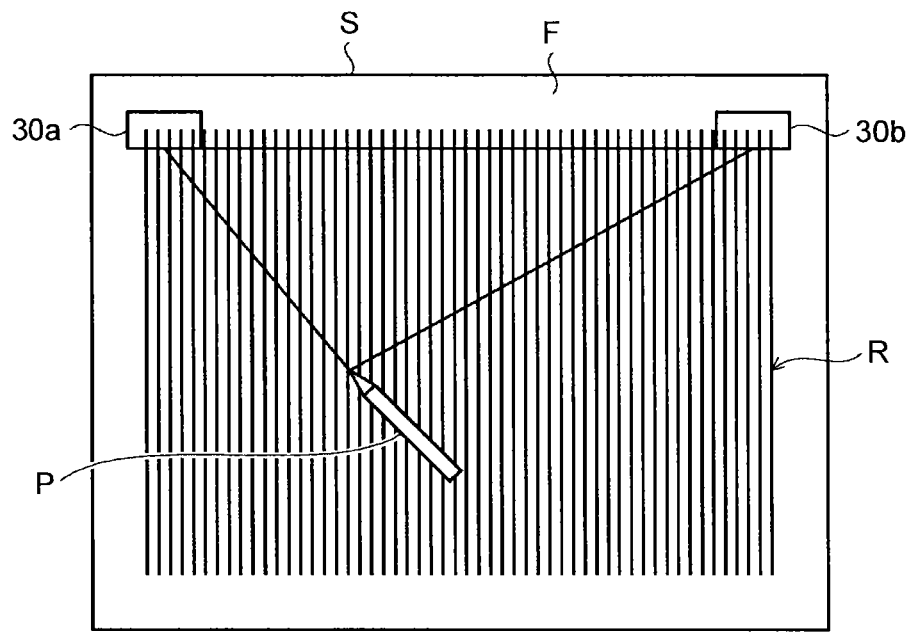
FIG. 5 is a diagram for explaining an operation position detection process according to the first embodiment.

The infrared receiving unit 32 detects infrared that is incident thereon after being emitted by the infrared emitting unit 31 and reflected by the reflection frame, and outputs a detection result to the infrared measuring unit 33 as illustrated in FIG. 5 for example.

The infrared measuring unit 33 detects, as an operation position on the projection plane F where an operation is performed by a user, the position of shadow in the infrared detection result obtained from the infrared receiving unit 32, and outputs operation position information to the measurement information transmitting unit 34. Specifically, when the user performs an operation on the projection plane F, infrared is shielded and the infrared receiving unit 32 detects shadow that occurs when the infrared is shielded due to the operation.

The measurement information transmitting unit 34 transmits, by radio, the operation position information received from the infrared measuring unit 33 to the projector 1 or the PC 110 that sends image data to the projector 1.

The projector 1 or the PC 110 detects the operation position of a user operation on the projection plane F by using a triangulation technology as illustrated in FIG. 5 for example, based on the operation position information sent by the sensor units 30a and 30b. The projector 1 or the PC 110 overlaps the operation position onto a projection image on the projection plane F or calculates the coordinates on the projection plane F to thereby detect the operation position.

The photoelectric power generating unit 35 is formed of, for example, a solar cell. The photoelectric power generating unit 35 generates power corresponding to the light intensity of projection light projected by the projector 1 and supplies the power to the units 31 to 34 of the sensor units 30a and 30b.

The amount of power consumed by the sensor units 30a and 30b per unit time is obtained in advance, and the amount of power generated by the photoelectric power generating unit 35 according to the intensity of the projection light is also obtained in advance. White-image-frame insertion amount data, which is used for setting the number of frames with white images to be inserted into image data per unit time to provide the necessary and sufficient amount of power with respect to the required power consumption, is stored in a nonvolatile memory of the light intensity calculating unit 10 or the ROM 21 of the system control unit 2. When the white-image-frame insertion amount data is stored in the ROM 21, and if the power switch 4 is turned on and power supply is started, the system control unit 2 sends the white-image-frame insertion amount data stored in the ROM 21 to the light intensity calculating unit 10.

The light intensity calculating unit 10 calculates the light intensity applied to the sensor units 30a and 30b based on the image data projected at the positions corresponding to the sensor units 30a and 30b on the projection plane F as described above, and outputs, to the image processing circuit 11, a frame insertion signal for inserting a frame with a white image into the image data at the positions of the sensor units 30a and 30b by referring to the white-image-frame insertion amount data based on the calculated light intensity. Specifically, the light intensity calculating unit 10 refers to the white-image-frame insertion amount data, and when it is necessary to increase the number of insertions of frames with white images per unit time in accordance with the calculated light intensity, the light intensity calculating unit 10 increases the number of insertions of frames with white images per unit time. When it is possible to decrease the number of insertions of frames with white images per unit time in accordance with the calculated light intensity, the light intensity calculating unit 10 decreases the number of insertions of frames with white images per unit time to prevent the projected image from becoming whitish. When it is not necessary to increase or decrease the number of insertions of frames with white images per unit time in accordance with the calculated light intensity with reference to the white-image-frame insertion amount data, the light intensity calculating unit 10 maintains the current number of insertions of frames with white images per unit time.

The projector 1 detects installation positions of the sensor units 30a and 30b on the projection plane F in order to calculate the light intensity applied to the sensor units 30a and 30b from the image data projected at the positions corresponding to the sensor units 30a and 30b.

Figure 6A:
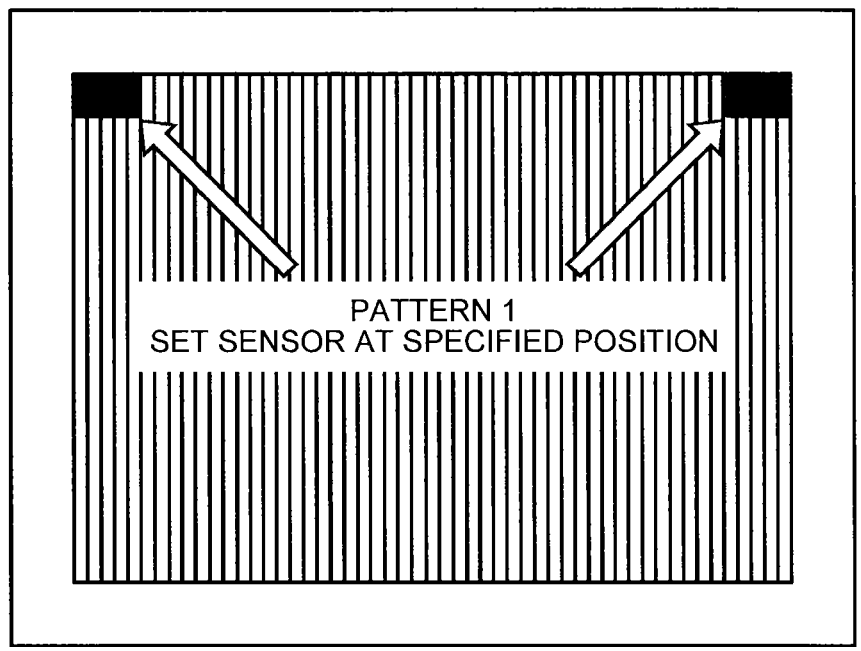
FIG. 6A is a diagram for explaining an example of a method for detecting an installation position of a sensor unit according to the first embodiment.
Figure 6B:
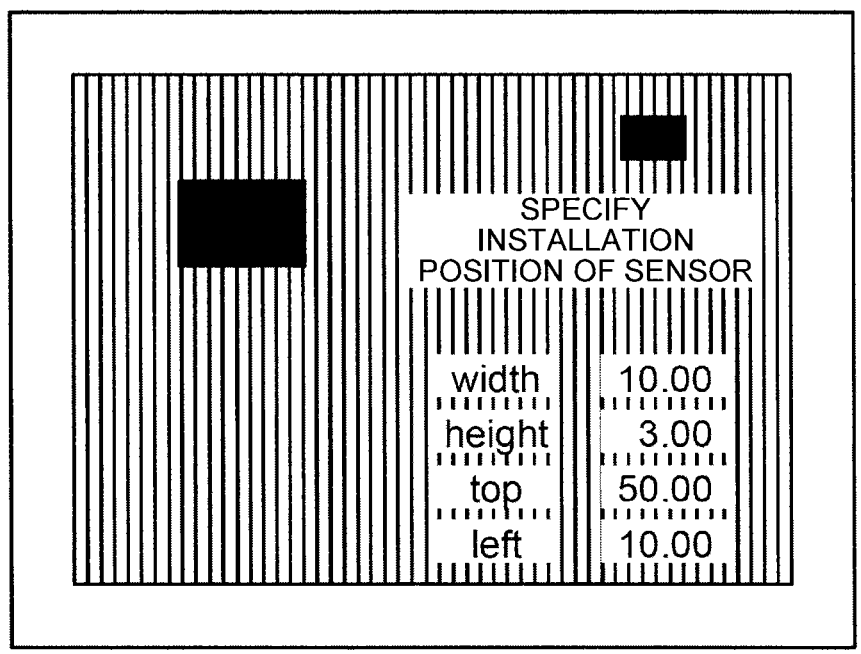
FIG. 6B is a diagram for explaining another example of the method for detecting an installation position of a sensor unit according to the first embodiment.

As a method for detecting the installation positions of the sensor units 30a and 30b on the projection plane F, various methods may be used. For example, as illustrated in FIG. 6A, it may be possible to use a method, in which a plurality of installation position patterns are provided and an installation position pattern is selected through an operation using the operating unit 14. For another example, various other methods may be used as described below: a method illustrated in FIG. 6B in which the installation positions and the sizes of the sensor units 30a and 30b on the projection plane F are appropriately set through an operation using the operating unit 14; or a method in which, when the projector 1 includes a camera, an image of the surface of the screen S is captured by the camera and the installation positions of the sensor units 30a and 30b are specified based on the captured image. In FIG. 6A, an installation position pattern, in which the sensor units 30a and 30b are installed at both corners of the upper side of the projection plane F on the screen S, is illustrated as a pattern 1. In FIG. 6B, a state is illustrated in which "width" and "height" indicating the sizes of the sensor and "top" and "left" indicating the installation positions of the sensor are set by values.

Upon acquiring the installation position information on the sensor units 30a and 30b, the system control unit 2 stores the installation position information in a nonvolatile memory of the system control unit 2, and sends the installation position information to the light intensity calculating unit 10 at an appropriate timing, for example, at a timing at which the power switch 4 is turned on. Alternatively, the system control unit 2 sends the acquired installation position information on the sensor units 30a and 30b to the light intensity calculating unit 10, and the light intensity calculating unit 10 stores the installation position information in the internal nonvolatile memory, calculates the light intensity of only image data corresponding to the positions of the sensor units 30a and 30b, and outputs the frame insertion signal for needed white images to the image processing circuit 11.

Operations according to the first embodiment will be explained below. The projector 1 according to the first embodiment detects the operation position on an image on the projection plane F without connecting a power cable to the sensor units 30a and 30b on the projection plane F. Therefore, the usability can be enhanced.

In the projector 1, the power switch 4 is turned on after the projector 1 and the screen S are installed at appropriate positions, the PC 110 is connected to the image input unit 5, and the power plug of the power code is inserted into an outlet. When the power switch 4 is turned on, the projector 1 initializes the units. Upon completing the initialization and acquiring the installation position information on the sensor units 30a and 30b on the projection plane F of the screen S as described above, the projector 1 stores the installation position information in the nonvolatile memory of the system control unit 2 or the nonvolatile memory of the light intensity calculating unit 10.

When an instruction operation for starting projection is performed through the operating unit 14, the projector 1 sends image data, which is input from the PC 110 to the system control unit 2 via the image input unit 5, to the image processing circuit 11 and the light intensity calculating unit 10. The image processing circuit 11 performs necessary image processing on the image data in accordance with the contents of the image processing set by the operating unit 14, and outputs the image data to the projection device 12.

The projection device 12 modulates the projection light, which is applied by the projection lamp 8 turned on by the lamp drive circuit 9, by a spatial light modulation system based on the image data input from the image processing circuit 11. The modulated light is projected onto the projection plane F of the screen S via the projection lens 13, so that an image is projected on the projection plane F.

Figure 7A:
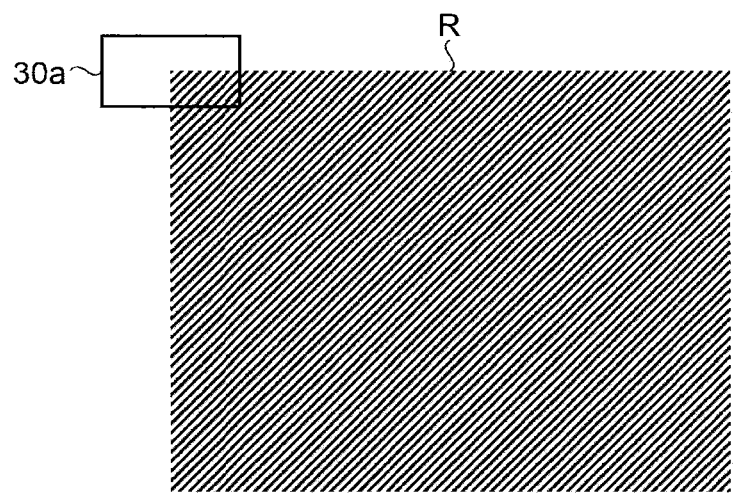
FIG. 7A is a diagram for explaining an example of a change in the amount of power generated by the sensor unit based on a projection image according to the first embodiment.
Figure 7B:
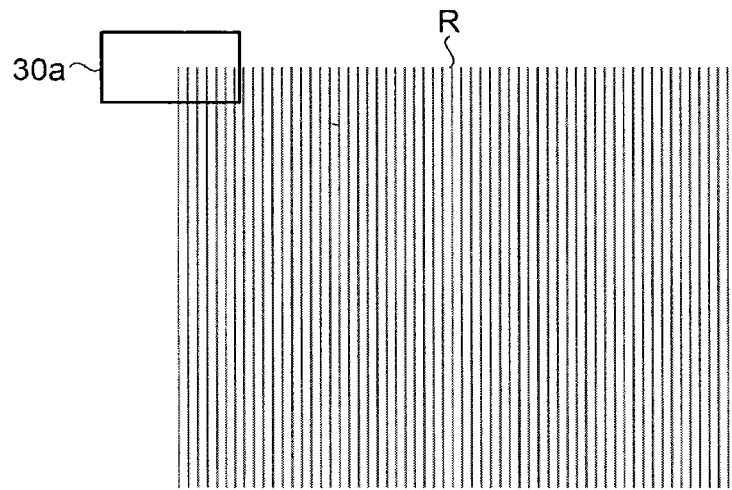
FIG. 7B is a diagram for explaining another example of a change in the amount of power generated by the sensor unit based on a projection image according to the first embodiment.

The light intensity calculating unit 10 determines the number of insertions of frames with white images per unit time based on the image data input from the system control unit 2, based on the installation position information on the sensor units 30a and 30b on the screen S, and based on the whiteimage-frame insertion amount data, and outputs the frame insertion signal based on the number of insertions of frames with white images per unit time to the image processing circuit 11. Specifically, as illustrated in FIG. 7A for example, when the light intensity of the projection image at the sensor units 30a and 30b is low, the amount of power generated by the photoelectric power generating unit 35 of the sensor units 30a and 30b is inadequate or power generation is impossible. On the other hand, as illustrated in FIG. 7B, when the light intensity of the projection image at the sensor units 30a and 30b is high, the amount of power generated by the photoelectric power generating unit 35 of the sensor units 30a and 30b is adequate or power generation is possible to a certain extent. The sensor units 30a and 30b perform sensor operations by using only power generated by the photoelectric power generating unit 35.

Figure 8:
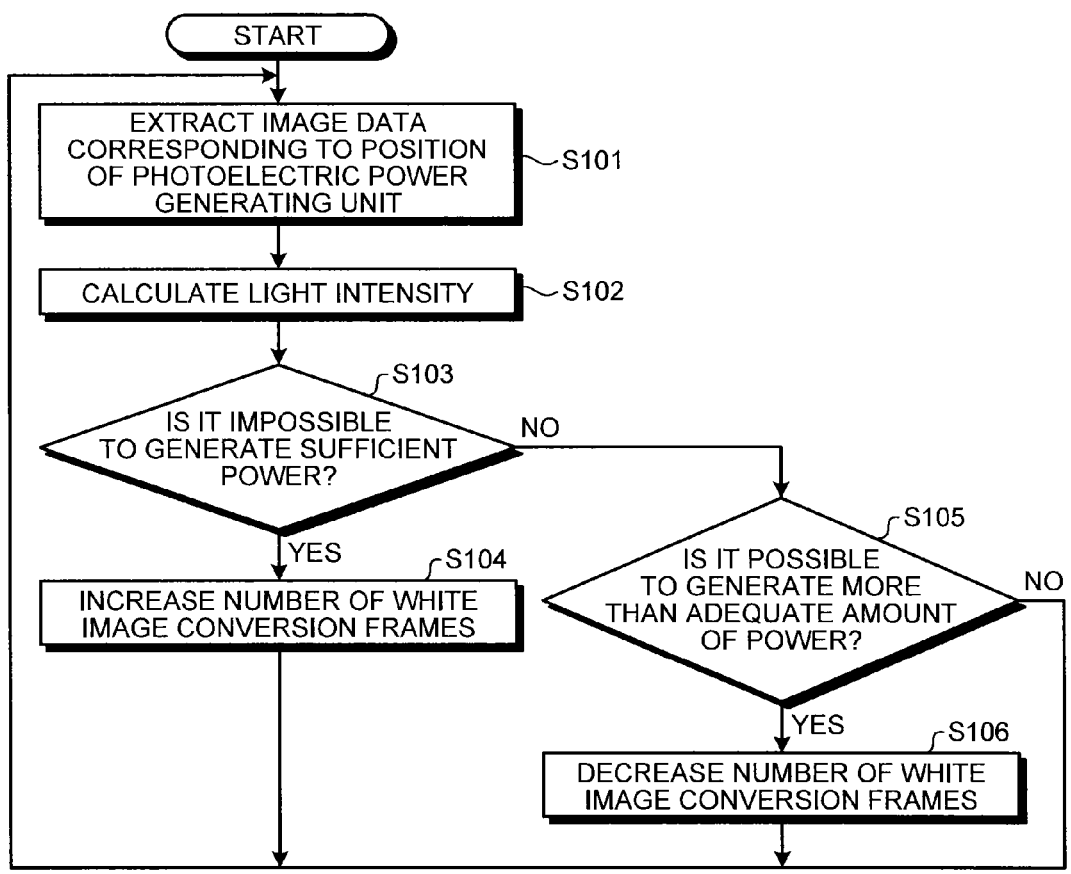
FIG. 8 is a flowchart of a power generation control process according to the first embodiment.

Therefore, as illustrated in FIG. 8, the light intensity calculating unit 10 performs a power generation control process based on the light intensity of the image data corresponding to the sensor units 30a and 30b.

Specifically, the light intensity calculating unit 10 extracts image data corresponding to the installation positions of the sensor units 30a and 30b, and more particularly corresponding to the installation position of the photoelectric power generating unit 35, from the image data input from the system control unit 2 (Step S101), and calculates the light intensity from the image data corresponding to the photoelectric power generating unit 35 (Step S102). The light intensity calculating unit 10 adds up RGB values of the lightness of the image data projected at the photoelectric power generating unit 35 of the sensor units 30a and 30b, thereby obtaining the light intensity applied to the photoelectric power generating unit 35 per unit time.

The light intensity calculating unit 10 checks whether it is impossible for the photoelectric power generating unit 35 to generate power with the calculated light intensity (Step S103). When it is impossible to generate power (YES at Step S103), the light intensity calculating unit 10 increases the number of white image conversion frames (Step S104), and the process returns to Step S101.

At Step S103, when it is not impossible for the photoelectric power generating unit 35 to generate power with the calculated light intensity (NO at Step S103), the light intensity calculating unit 10 checks whether the photoelectric power generating unit 35 can generate more than adequate amount of power for operating the sensor units 30a and 30b with the light intensity (Step S105).

At Step S105, when more than adequate amount of power can be generated (YES at Step S105), the light intensity calculating unit 10 decreases the number of white image conversion frames (Step S106), and the process returns to Step S101. At Step S105, when more than adequate power cannot be generated (NO at Step S105), the light intensity calculating unit 10 does not increase or decrease the number of white image conversion frames, and the process returns to Step S101.

Figure 9:
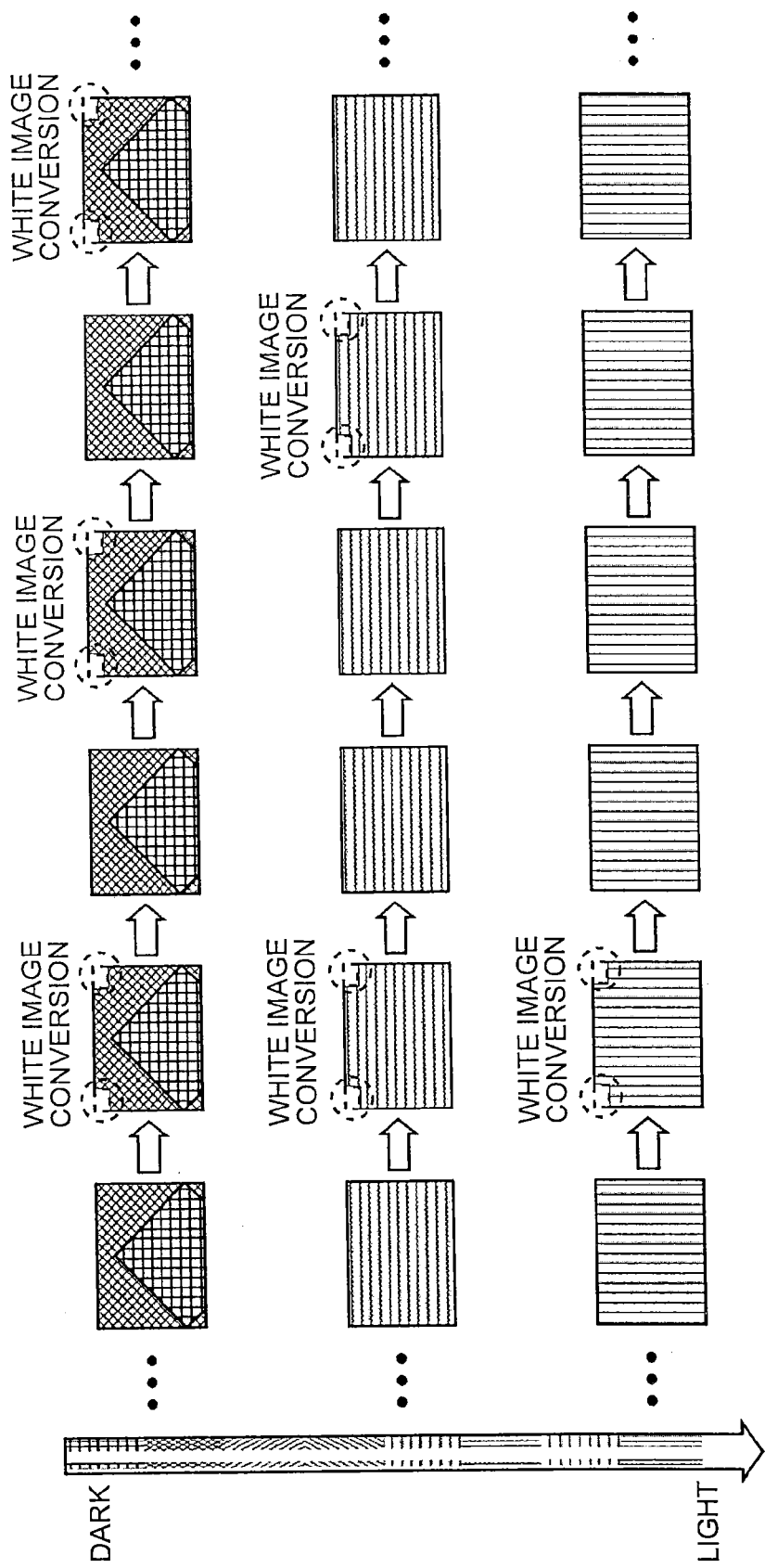
FIG. 9 is a diagram illustrating a relationship between the lightness/darkness of an image at the sensor unit and the number of insertions of white images according to the first embodiment.

Specifically, as illustrated in the upper part in FIG. 9 for example, when the light intensity of the photoelectric power generating unit 35 of the sensor units 30a and 30b is low and image data is dark, the light intensity calculating unit 10 increases the number of white image conversion frames in the image data corresponding to the sensor units 30a and 30b to thereby increase the number of insertions of white images as indicated by dashed-line circles in the upper part in FIG. 9. As illustrated in the middle part in FIG. 9 for example, when the light intensity of the photoelectric power generating unit 35 of the sensor units 30a and 30b is at a middle level, the light intensity calculating unit 10 does not increase or decrease the number of white image conversion frames in the image data corresponding to the sensor units 30a and 30b to thereby maintain the number of insertions of white images at the middle level as indicated by dashed-line circles in the middle part in FIG. 9. As illustrated in the lower part in FIG. 9 for example, when the light intensity of the photoelectric power generating unit 35 of the sensor units 30a and 30b is high and image data is light, the light intensity calculating unit 10 decreases the number of white image conversion frames in the image data corresponding to the sensor units 30a and 30b to thereby decrease the number of insertions of white images as indicated by dashed-line circles in the lower part in FIG. 9.

Figure 10:
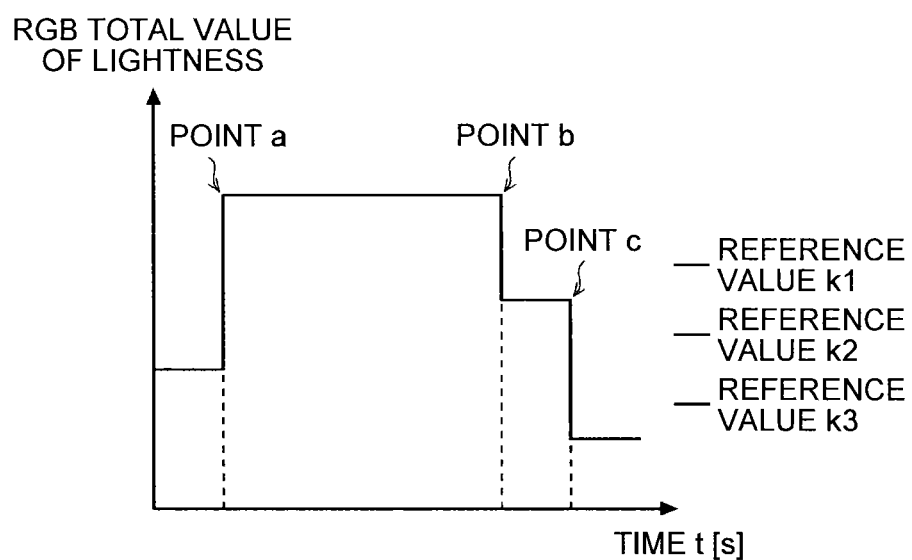
FIG. 10 is a diagram illustrating a relationship between the light intensities of projection images and reference values for insertion of white images according to the first embodiment.

As illustrated in FIG. 10, for example, it is assumed that still images projected by the projector 1 onto the screen S are switched at time points a, b, and c, and the total value of the RGB values of the lightness of the image data corresponding to the photoelectric power generating unit 35 of the sensor units 30a and 30b changes as illustrated in FIG. 10. In this case, because the light intensity before the image is switched at the time point a takes, for example, a value between a preset reference value k2 and a preset reference value k3, the light intensity calculating unit 10 inserts, in the power generation control process described above, white images at preset intervals of, for example, 0.1 second into a part of the still images to be projected. Furthermore, because the light intensity in a period from the time point a to the time point b at which the image is switched is equal to or greater than a preset reference value k1, the light intensity calculating unit 10 determines that the projection light is adequately applied to the photoelectric power generating unit 35 and does not insert a white image. Moreover, because the light intensity in a period from the time point b to the time point c at which the image is switched takes a value between the reference value k1 and the reference value k2, the light intensity calculating unit 10 inserts white images at preset intervals of, for example, 0.2 second into a part of the still images to be projected. Finally, when the projected image is switched at the time point c and the light intensity becomes equal to or smaller than the reference value k3, the light intensity calculating unit 10 inserts white images at preset intervals of, for example, 0.05 second into a part of the still images to be projected.

It is possible to appropriately set the reference values, which are used for determining the light intensity of the photoelectric power generating unit 35 of the sensor units 30a and 30b, and the intervals, at which the white images are inserted (the number of insertions of frames) according to the light intensity of the photoelectric power generating unit 35, based on the power needed by the sensor units 30a and 30b and based on the power generation capability of the photoelectric power generating unit 35.

In this way, the projector 1 according to the first embodiment includes: a projection means and a image processing means. The projection means includes the projection lamp 8 for projecting an image of image data onto the projection plane F located at a predetermined distance, the projection device 12, and the projection lens 13. The image processing means includes the sensor units (operation position detecting means) 30a and 30b that are installed on the projection plane F and that detect the operation position on the image on the projection plane F; the photoelectric power generating unit (photoelectric means) 35 that is installed at a predetermined position in the area (projection area) R in which the image is projected on the projection plane F, that generates power corresponding to the intensity of the projection light projected by the projection means, and that supplies the power to the sensor units 30a and 30b; the image processing circuit 11;

and the light intensity calculating unit 10 and that converts image data, which is supplied to the projection means and which is projected at the installation position of the photoelectric power generating unit 35, into white image data containing a white image at a predetermined rate.

Therefore, the photoelectric power generating unit 35 can generate all the power needed by the sensor units 30a and 30b to drive the sensor units 30a and 30b, and it becomes possible to detect the operation position on the image on the projection plane F without connecting a power cable to the sensor units 30a and 30b on the projection plane F. Therefore, the usability can be enhanced.

Furthermore, the projector 1 according to the first embodiment performs the power generation control method that includes: a projection processing step including projecting an image of image data onto the projection plane F located at a predetermined distance; an operation position detection processing step including detecting the operation position on the image on the projection plane F by the sensor units 30a and 30b installed on the projection plane F; a photoelectric power generation processing step including generating power corresponding to the intensity of the projection light projected at the projection processing step, by the photoelectric power generating unit 35 installed at a predetermined position in the projection area R in which the image is projected and including supplying the power to the sensor units 30a and 30b; and an image processing step including converting image data, which is supplied at the projection processing step and which is projected at the installation position of the photoelectric power generating unit 35, into white image data containing a white image at a predetermined rate.

Therefore, the photoelectric power generating unit 35 can generate all the power needed by the sensor units 30a and 30b to drive the sensor units 30a and 30b, and it becomes possible to detect the operation position on the image on the projection plane F without connecting a power cable to the sensor units 30a and 30b on the projection plane F. Therefore, the usability can be enhanced.

Moreover, the projector 1 according to the first embodiment is provided with a power generation control program that, when executed, causes a computer to perform: a projection process for projecting an image of image data onto the projection plane F located at a predetermined distance; an operation position detection process for detecting the operation position on the image on the projection plane F by the sensor units 30a and 30b installed on the projection plane F; a photoelectric process for generating power corresponding to the intensity of the projection light projected in the projection process, by the photoelectric power generating unit 35 installed at a predetermined position in the projection area R in which the image is projected and for supplying the power to the sensor units 30a and 30b; and image processing for converting image data, which is supplied in the projection process and which is projected at the installation position of the photoelectric power generating unit 35, into white image data containing a white image at a predetermined rate.

Therefore, the photoelectric power generating unit 35 can generates all the power needed by the sensor units 30a and 30b to drive the sensor units 30a and 30b, and it becomes possible to detect the operation position on the image on the projection plane F without connecting a power cable to the sensor units 30a and 30b on the projection plane F. Therefore, the usability can be enhanced.

Furthermore, the projector 1 according to the first embodiment includes the light intensity calculating unit (light intensity calculating means) 10 that calculates the light intensity of image data projected at the installation position of the photoelectric power generating unit 35 per unit time from the image data provided to the projection device 12. The light intensity calculating unit 10 adjusts the number of frames of white image data to be converted per unit time based on the calculated light intensity with respect to the image data to be processed by the image processing circuit 11.

Therefore, it is possible to calculate the light intensity that can be used for power generation based on the image data projected at the photoelectric power generating unit 35, and it is possible to perform image conversion so that the photoelectric power generating unit 35 can efficiently generate all the power needed by the sensor units 30a and 30b. Consequently, it becomes possible to detect the operation position on the image on the projection plane F without connecting a power cable to the sensor units 30a and 30b on the projection plane F. As a result, the usability can be enhanced.

Moreover, in the projector 1 according to the first embodiment, the light intensity calculating unit 10 calculates, as the light intensity per unit time, the total value of the lightness of RGB image data projected at the installation position of the photoelectric power generating unit 35 per unit time.

Therefore, it becomes possible to more accurately calculate the light intensity that can be used for power generation based on the image data projected at the photoelectric power generating unit 35, and it becomes possible to perform image conversion so that the photoelectric power generating unit 35 can more efficiently generate all the power needed by the sensor units 30a and 30b. Consequently, it becomes possible to detect the operation position on the image on the projection plane F without connecting a power cable to the sensor units 30a and 30b on the projection plane F. As a result, the usability can be enhanced.

Furthermore, the projector 1 according to the first embodiment includes a position specifying means for specifying the position of the photoelectric power generating unit 35. As the position specifying means, the projector 1 includes one of the followings: the operating unit (selecting means) 14 for selecting an appropriate installation position pattern from a plurality of installation position patterns indicating the installation position of the photoelectric power generating unit 35 on the projection plane F; the operating unit (position specifying means) 14 for inputting the installation position of the photoelectric power generating unit 35 on the projection plane F and the size of the photoelectric power generating unit 35; and the photoelectric power generating unit 35 on the projection plane F, specifically, a camera (position shooting means) that captures an image of the sensor units 30a and 30b to thereby acquire the installation position of the photoelectric power generating unit 35.

Therefore, it is possible to accurately acquire the installation position of the photoelectric power generating unit 35, calculate the light intensity of only the image data projected at the position of the photoelectric power generating unit 35, and appropriately convert only the image data projected at the position of the photoelectric power generating unit 35 into white image data. Consequently, it becomes possible to improve the quality of the projected image and detect the operation position on the image on the projection plane F without connecting a power cable to the sensor units 30a and 30b on the projection plane F. As a result, the usability can be enhanced.

Second Embodiment

Figure 11:
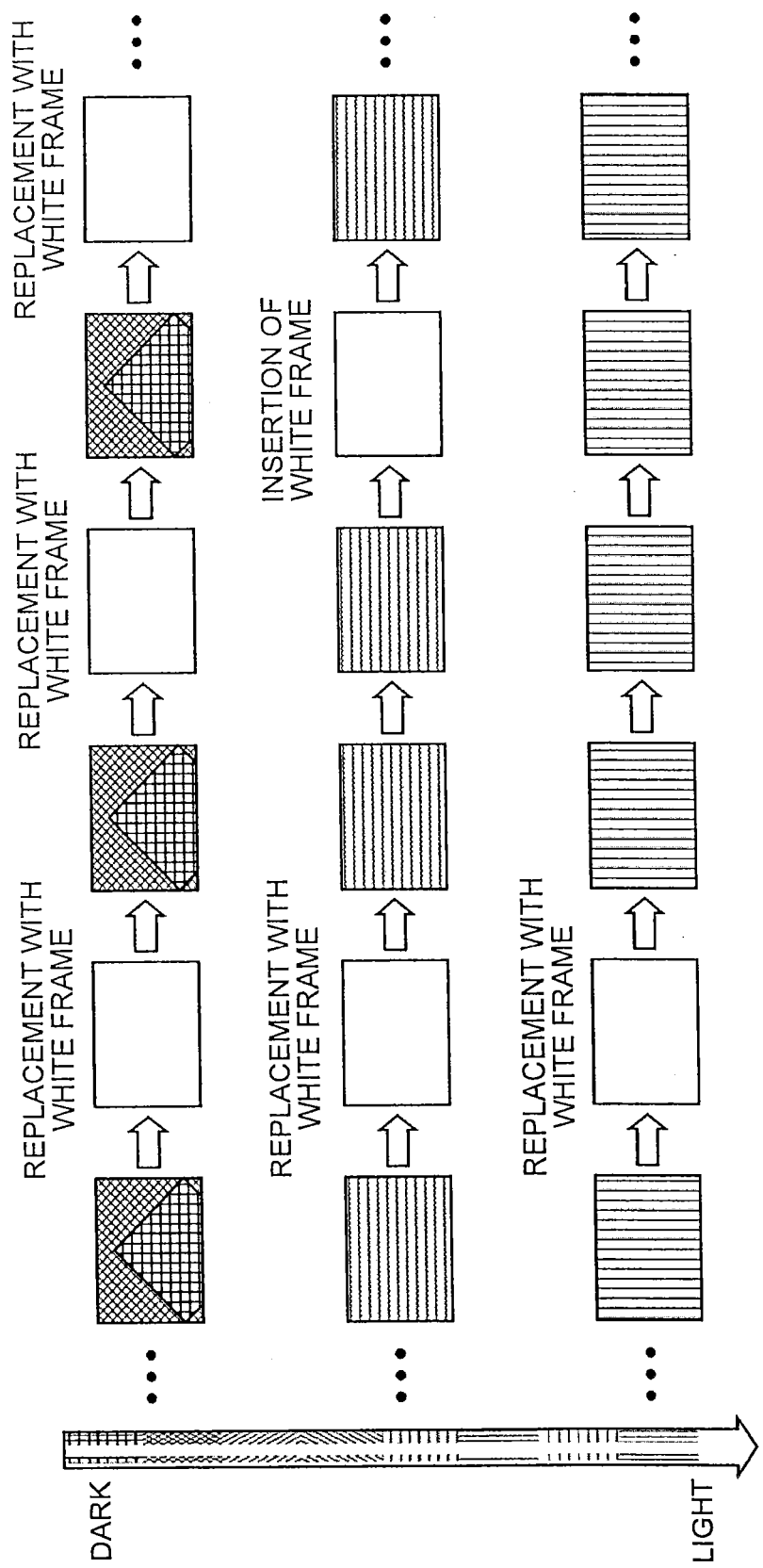
FIG. 11 is a diagram illustrating a relationship between the lightness/darkness of an image at the sensor unit and the number of replacements with white images according to a second embodiment of the present invention.

A projection system, a projection apparatus, a sensor device, a power generation control method, and a power generation control program according to a second embodiment of the present invention will be explained in detail below with reference to the drawings. In the first embodiment described above, as illustrated in FIG. 9, a white image conversion frame, in which a white image is inserted in a part of a still image to be projected, is used. By contrast, in the second embodiment, as illustrated in FIG. 11, an image frame to be a target image in which a white image is to be inserted is replaced with a white frame, instead of using the white image conversion frame.

Figure 12:
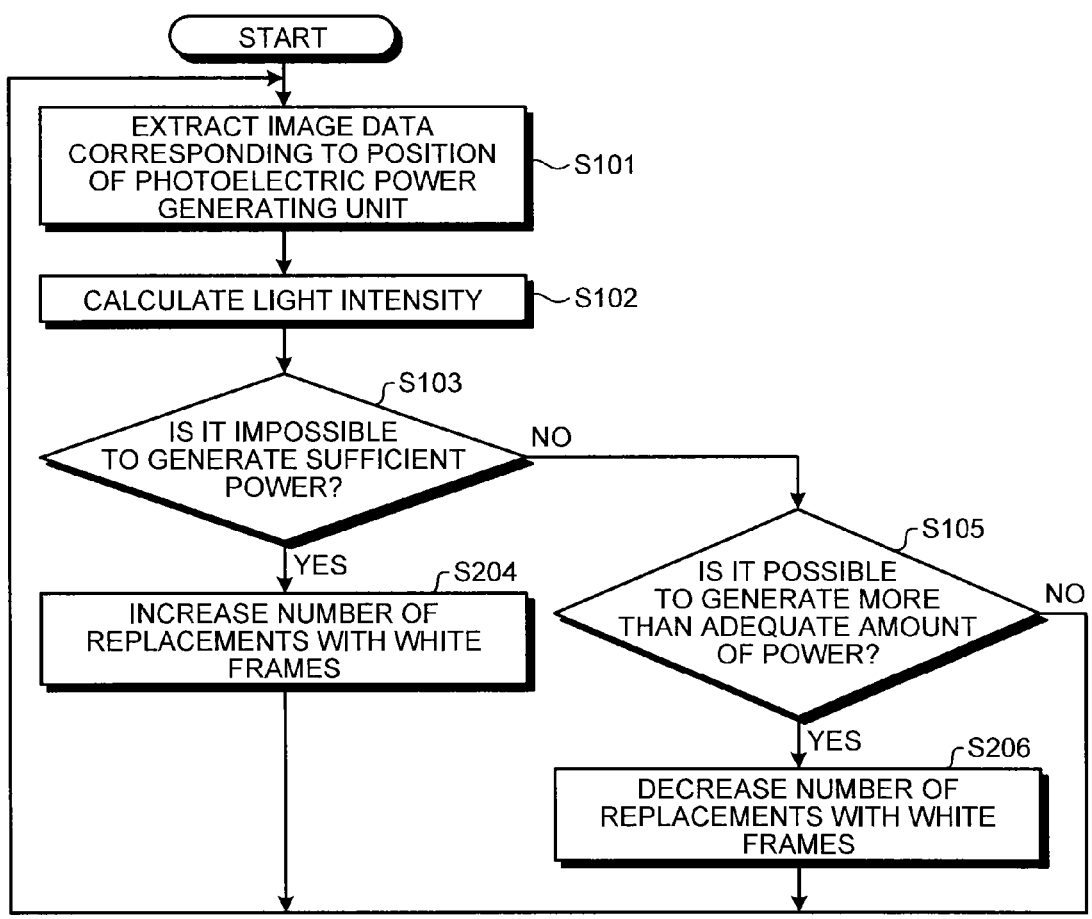
FIG. 12 is a flowchart of a power generation control process according to the second embodiment.

FIG. 12 is a flowchart of the flow of a power generation control process according to the second embodiment. In FIG. 12, the same processes as those of the power generation control process explained with reference to FIG. 8 in the above first embodiment are denoted by the same reference symbols and numerals, and detailed explanation thereof will not be repeated.

As illustrated in FIG. 12, in the power generation control process according to the second embodiment, the same processes as those at Steps S101 to S103 in FIG. 8 are performed. At Step S103, when it is impossible for the photoelectric power generating unit 35 to generate power with the calculated light intensity (YES at Step S103), the number of image frames to be replaced with white frames is increased (Step S204), and the process returns to Step S101.

At Step S103, when it is not impossible for the photoelectric power generating unit 35 to generate power with the calculated light intensity (NO at Step S103), similarly to the first embodiment, it is checked whether the photoelectric power generating unit 35 can generate more than adequate amount of power for operating the sensor units 30a and 30b with the light intensity (Step S105). When more than adequate amount of power can be generated (YES at Step S105), the light intensity calculating unit 10 decreases the number of image frames to be replaced with white frames (Step S206), and the process returns to Step S101. At Step S105, when more than adequate amount of power cannot be generated (NO at Step S105), the light intensity calculating unit 10 does not increase or decrease the number of image frames to be replaced with white frames, and the process returns to Step S101.

Even with the configuration described above, it is possible to achieve the same advantageous effects as those of the first embodiment. The other configurations and operations are the same as those described in the first embodiment, and therefore, explanation thereof will not be repeated.

Third Embodiment

A projection system, a projection apparatus, a sensor device, a power generation control method, and a power generation control program according to a third embodiment of the present invention will be explained in detail below with reference to the drawings. In the above first and the second embodiments, the light intensity calculating unit 10 of the projector 1 calculates the amount of power generated by the photoelectric power generating unit 35 of the sensor units 30a and 30b based on the image frame to be projected. By contrast, in the third embodiment, a sensor unit installed on the screen S measures the amount of power generation and increases or decreases the number of white image conversion frames or the number of replacements with white frames based on the measurement result. In the explanation below, the same configurations as those of the first or the second embodiment are denoted by the same reference symbols and numerals, and detailed explanation thereof will not be repeated.

The projection system according to the third embodiment has the same configuration as the projection system 100 illustrated in FIG. 1. However, the sensor units 30a and 30b, the projector 1, and the PC 110 are replaced with sensor units 230a and 230b, a projector 201, and a PC 210, respectively.

Figure 13:
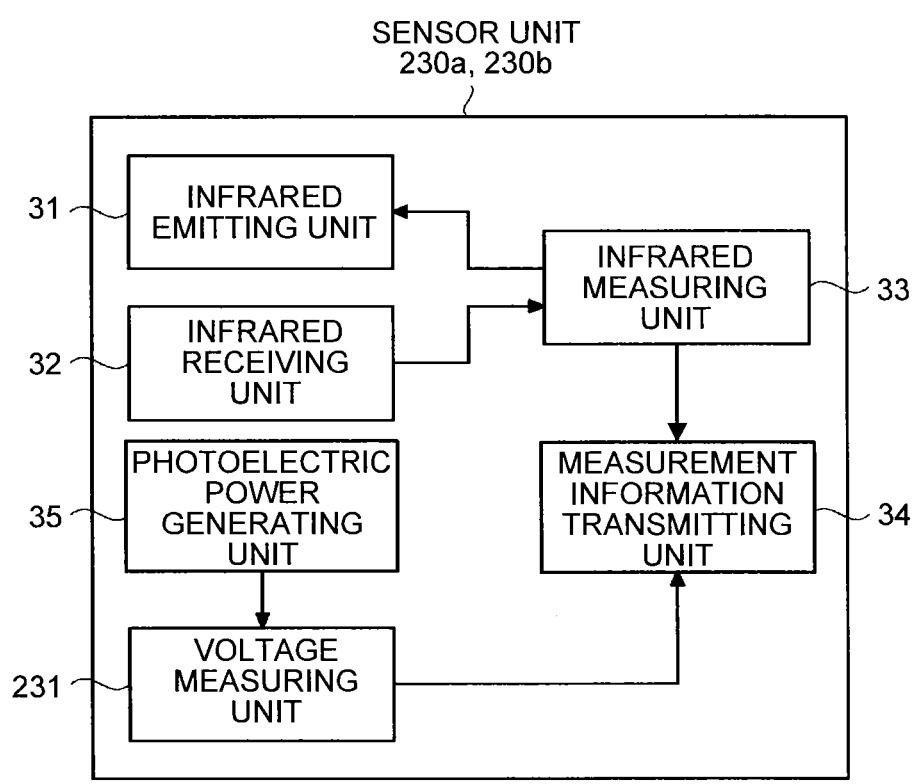
FIG. 13 is a block diagram of a configuration of a sensor unit according to a third embodiment of the present invention.

FIG. 13 is a block diagram illustrating an overall configuration of the sensor units according to the third embodiment. As illustrated in FIG. 13, each of the sensor units 230a and 230b of the third embodiment includes a voltage measuring unit 231 that measures a voltage value of power generated by the photoelectric power generating unit 35, in addition to the same components included in the sensor units 30a and 30b illustrated in FIG. 4. The voltage value measured by the voltage measuring unit 231 is input to the measurement information transmitting unit 34. The measurement information transmitting unit 34 transmits, by radio, power information input from the voltage measuring unit 231 to the projector 1 or the PC 110 that sends image data to the projector 1, in addition to the operation position information input by the infrared measuring unit 33.

Figure 14:
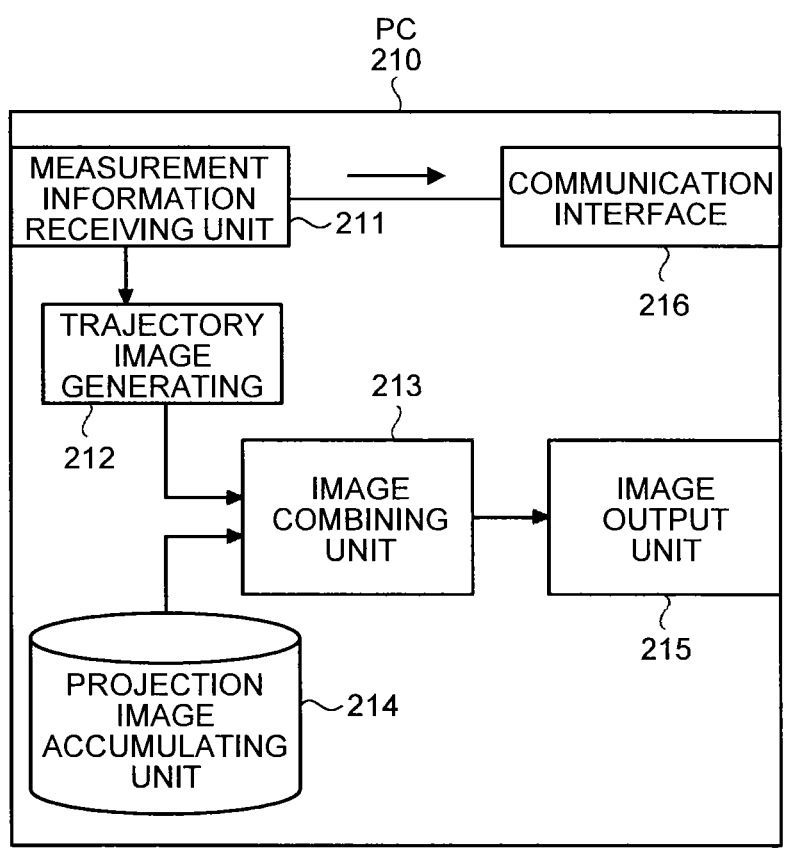
FIG. 14 is a block diagram of a configuration of a personal computer (PC) according to the third embodiment.

FIG. 14 is a block diagram illustrating an overall configuration of the PC according to the third embodiment. As illustrated in FIG. 14, the PC 210 of the third embodiment includes a measurement information receiving unit 211, a trajectory image generating unit 212, an image combining unit 213, a projection image accumulating unit 214, an image output unit 215, and a communication interface 216. The measurement information receiving unit 211 receives the operation position information and the power information which are transmitted by radio by the measurement information transmitting unit 34 of the sensor units 230a and 230b. The operation position information among the received pieces of information is input to the trajectory image generating unit 212. The power information among the pieces of information received by the measurement information receiving unit 211 is transmitted to the projector 201 via the communication interface 216.

The trajectory image generating unit 212 draws the trajectory of the pen P in chronological order according to the input operation position information and generates image data (a trajectory image). The generated trajectory image is input to the image combining unit 213.

The projection image accumulating unit 214 accumulates still images to be projected by the projector 201. The still images to be projected are input in addition to the trajectory image to the image combining unit 213. The image combining unit 213 superimposes the trajectory image onto the input still images and inputs the obtained images, as the projection images, to the image output unit 215. The image output unit 215 outputs the input projection images to the projector 201 via, for example, a RGB cable, a Bayonet Neill Concelman (BNC) cable, or a USB cable.

In the configuration illustrated in FIG. 14, the configurations other than the communication interface 216 may be the same as those of the first and the second embodiments described above.

Figure 15:
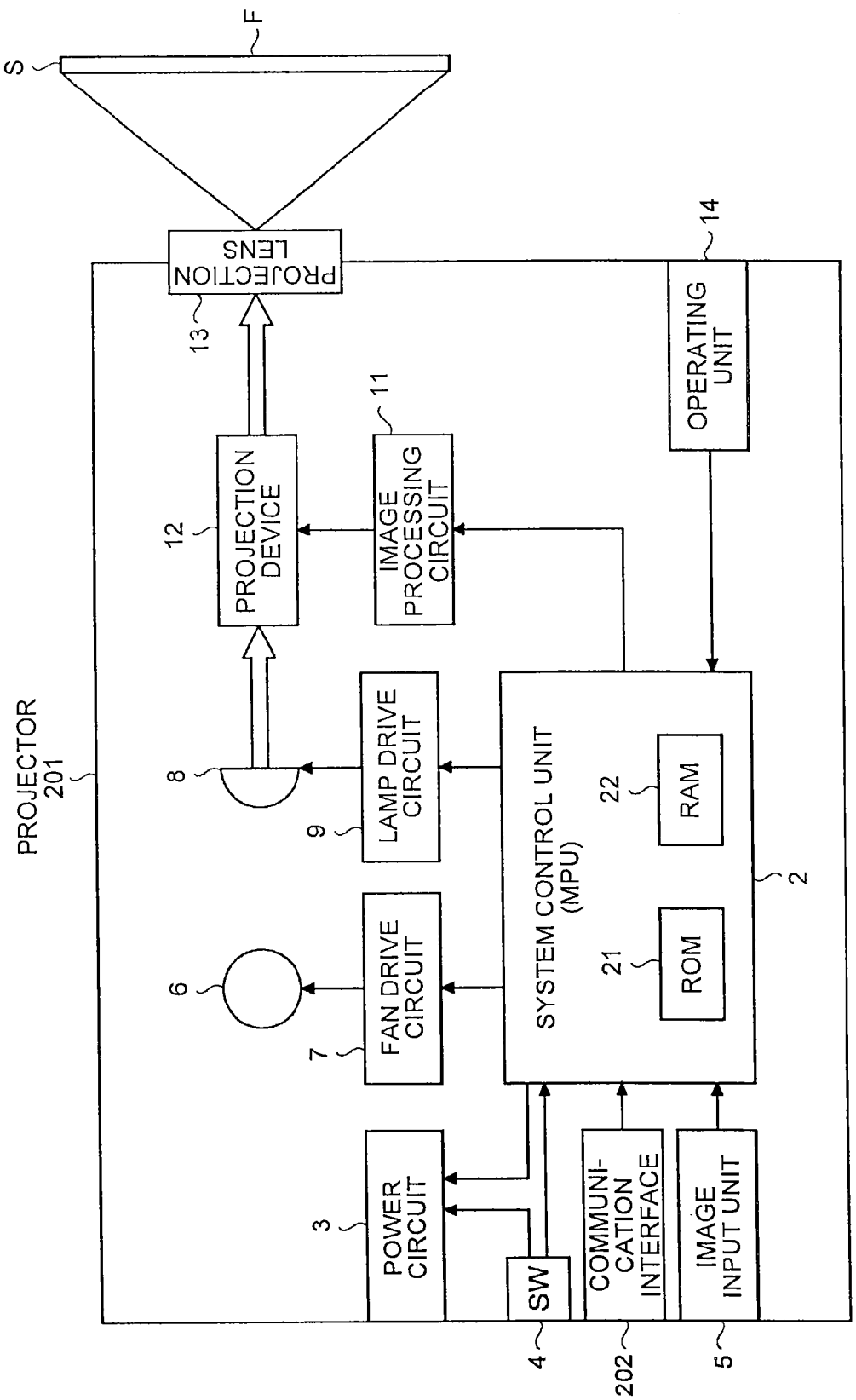
FIG. 15 is a block diagram of a configuration of a projector according to the third embodiment.

FIG. 15 is a block diagram illustrating an overall configuration of the projector according to the third embodiment. As illustrated in FIG. 15, the projector 201 of the third embodiment further includes a communication interface 202 in addition to the same components included in the projector 1 illustrated in FIG. 3. In the projector 201 of the third embodiment, the light intensity calculating unit 10 is omitted.

The power information output by the communication interface 216 of the PC 210 is input to the communication interface 202. The communication interfaces 216 and 202 may be connected to each other by radio or by a cable. The power information input to the communication interface 202 is input to the system control unit 2. The system control unit 2 increases or decreases the number of white image conversion frames or the number of replacements with white frames based on the input power information, similarly to the light intensity calculating unit 10 of the first and the second embodiments. In the first and the second embodiments, the light intensity calculated from the image frame is used to determine the amount of power generated by the photoelectric power generating unit 35 of the sensor units 30a and 30b. However, in the third embodiment, the power information is used instead of the light intensity.

Figure 16:
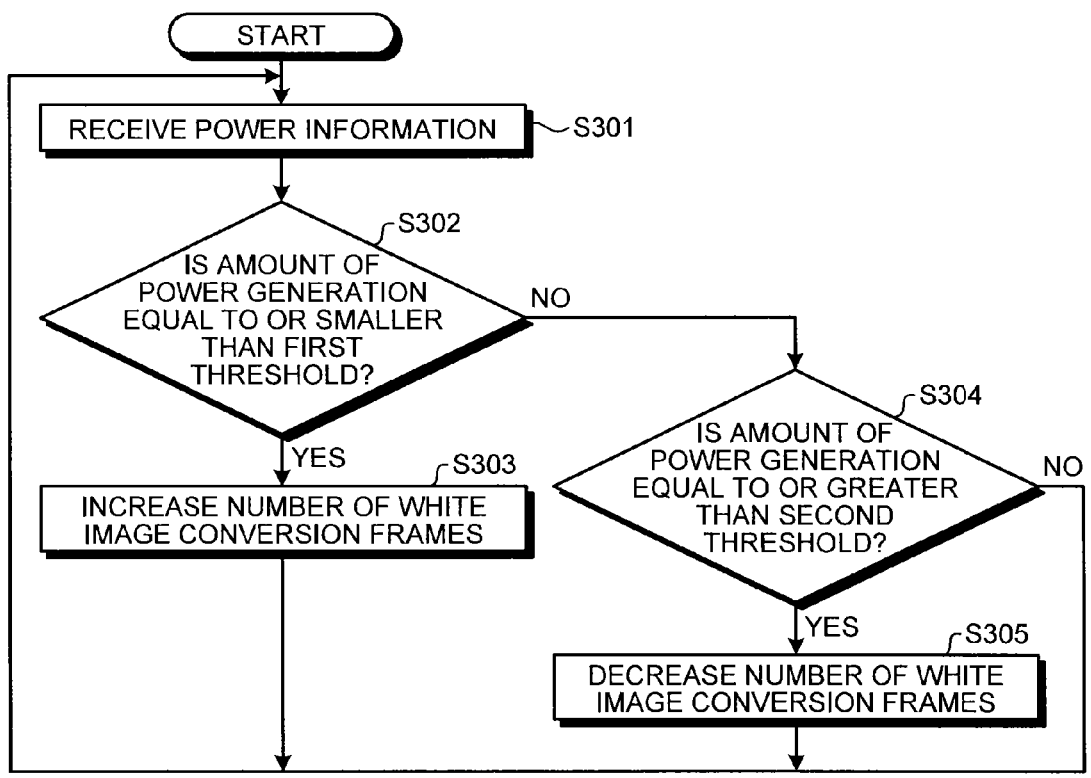
FIG. 16 is a flowchart of a power generation control process according to the third embodiment.

FIG. 16 is a flowchart of the flow of a power generation control process according to the third embodiment. As illustrated in FIG. 16, in the power generation control process according to the third embodiment, the system control unit 2 receives the power information via the communication interface 202 (Step S301). The system control unit 2 determines whether the amount of power generated by the photoelectric power generating unit 35 of the sensor units 230a and 230b is equal to or smaller than a first threshold based on the power information (Step S302). When the amount of power generation is equal to or smaller than the first threshold (YES at Step S302), the system control unit 2 increases the number of white image conversion frames (Step S303), and the process returns to Step S301.

At Step S302, when the amount of power generation is greater than the first threshold (NO at Step S302), the system control unit 2 determines whether the amount of power generation is equal to or greater than a second threshold (Step S304). When the amount of power generation is equal to or greater than the second threshold (YES at Step S304), the system control unit 2 decreases the number of white image conversion frames (Step S305), and the process returns to Step S301. At Step S304, when the amount of power generation is smaller than the second threshold (NO at Step S304), the system control unit 2 does not increase or decrease the number of white image conversion frames, and the process returns to Step S301.

Even with the configuration described above, it is possible to achieve the same advantageous effects as those of the first embodiment. Furthermore, according to the third embodiment, it becomes possible to cope with the nearby environment, such as lightness of a room in which the sensor units 230a and 230b are installed. Specifically, when, for example, the room in which the sensor units 230a and 230b are installed is dark and the amount of power generated by the photoelectric power generating unit 35 is small, it is possible to increase the number of white image conversion frames or the number of replacements of white frames in order to increase the amount of power generated by the photoelectric power generating unit 35. When the room is light and the amount of power generated by the photoelectric power generating unit 35 is large, it is possible to decrease the number of white image conversion frames or the number of replacements with white frames in order to prevent the projection image from becoming whitish and blur. The other configurations and operations are the same as those of the first or the second embodiment, and detailed explanation thereof will not be repeated.

Fourth Embodiment

A projection system, a projection apparatus, a sensor device, a power generation control method, and a power generation control program according to a fourth embodiment of the present invention will be explained in detail below with reference to the drawings. In the above embodiments, explanation is given based on the assumption that the projection image is a still image; however, the present invention is not limited thereto. Specifically, the projection image may be a moving image. In this case, it may be possible to determine the amount of power generated by the photoelectric power generating unit 35 of the sensor units 30a and 30b based on a plurality of image frames rather than a single image frame. In the fourth embodiment below, a case is explained where the amount of power generated by the photoelectric power generating unit 35 is determined based on a plurality of moving image frames. In the explanation below, the same components as those of the first, the second, or the third embodiment are denoted by the same reference symbols and numerals, and detailed explanation thereof will not be repeated.

Figure 17:
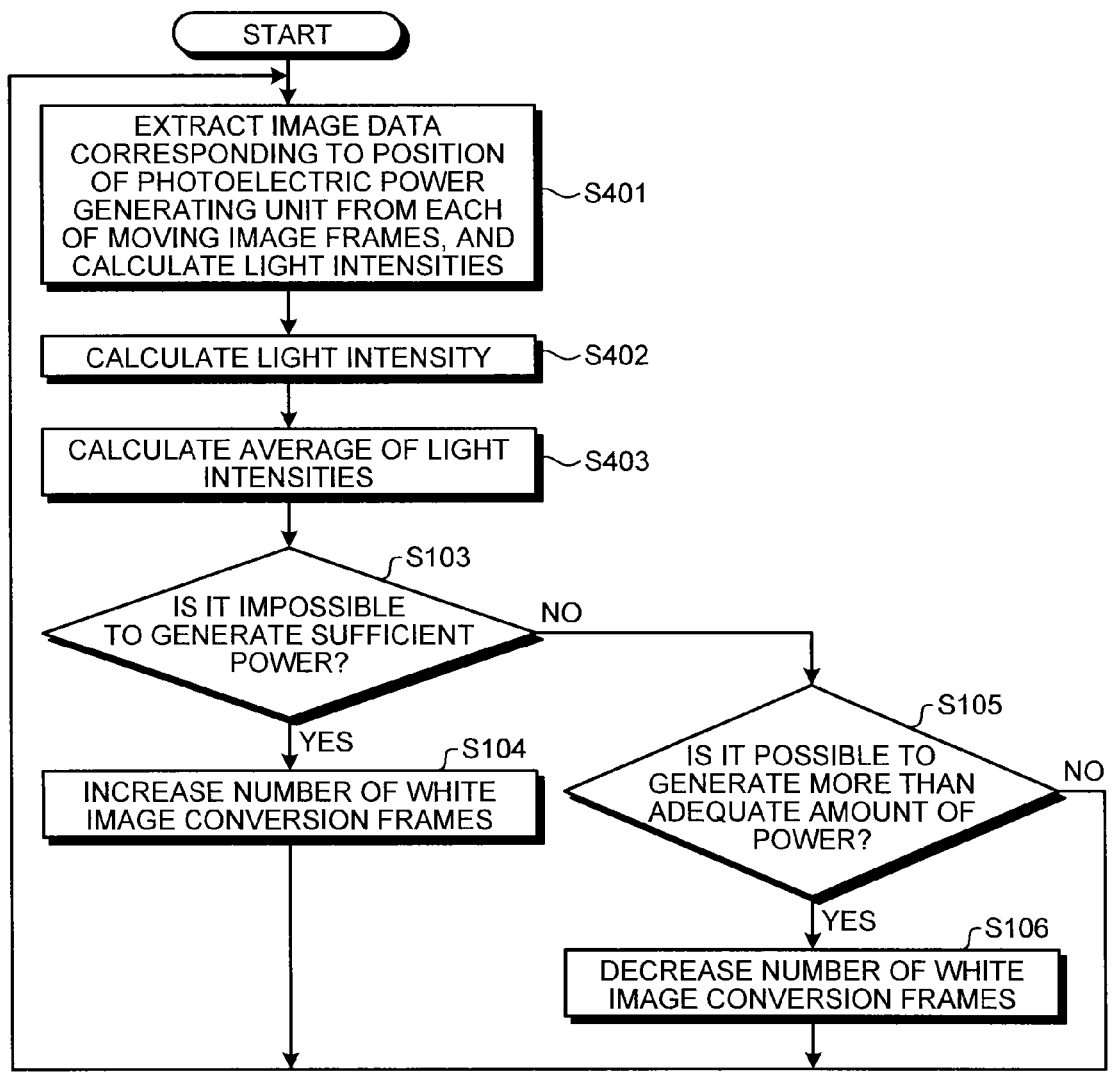
FIG. 17 is a flowchart of a power generation control process according to a fourth embodiment of the present invention.

FIG. 17 is a flowchart of the flow of a power generation control process according to the fourth embodiment. As illustrated in FIG. 17, the light intensity calculating unit 10 extracts image data corresponding to the installation positions of the sensor units 30a and 30b (specifically, corresponding to the photoelectric power generating unit 35) from each of moving image frames (for example, five frames) which are sequentially input by the system control unit 2 (Step S401), and calculates the light intensity based on each of the image data corresponding to the photoelectric power generating unit 35 (Step S402). The light intensity calculating unit 10 adds up RGB values of the lightness of each of the moving image data projected at the photoelectric power generating unit 35 of the sensor units 30a and 30b to thereby obtain the light intensity applied to the photoelectric power generating unit 35 per unit time.

The light intensity calculating unit 10 calculates an average of the light intensities calculated at Step S402 (Step S403). It may be possible to obtain a total value of a predetermined number of moving image frames instead of obtaining the average.

The light intensity calculating unit 10 performs the same processes as those at, for example, Steps S103 to S106 in FIG. 8 explained in the above first embodiment, to thereby increase or decrease the number of white image conversion frames or the number of replacements with white frames based on the amount of power generated by the photoelectric power generating unit 35 according to need, and the process returns to Step S401.

With the operations described above, even in the case of the moving images, it is possible to achieve the same advantageous effects as those of the above embodiments. The other configurations and operations are the same as those of the first, the second, or the third embodiment, and detailed explanation will not be repeated.

According to one embodiment of the present invention, it is possible to omit a power cable connected to a sensor on a projection plane.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection system comprising:
  a projecting unit that projects an image onto a projection plane;
  a sensor unit that is installed at a predetermined position in an area in which the image is projected on the projection plane and that includes a photoelectric power generating unit which generates power corresponding to an intensity of projection light projected by the projecting unit, the sensor unit including a driving unit that operates by using the power generated by the photoelectric power generating unit.

2. The projection system according to claim 1, further comprising an image processing unit that converts at least image data to be projected at an installation position of the photoelectric power generating unit into white image data or converts a whole frame of the image data into white image data.

3. The projection system according to claim 2, further comprising a light intensity calculating unit that calculates a light intensity of the image data projected at the installation position of the photoelectric power generating unit per unit time in the image data provided to the projecting unit, wherein
the image processing unit adjusts the number of frames of image data to be converted into the white image data per unit time based on the light intensity calculated by the light intensity calculating unit.

4. The projection system according to claim 3, wherein the light intensity calculating unit calculates, as the light intensity per unit time, a total value of RGB values of lightness of the image data projected at the installation position of the photoelectric power generating unit per unit time.

5. The projection system according to claim 1, further comprising a position specifying unit that specifies the installation position of the photoelectric power generating unit.

6. The projection system according to claim 5, wherein the position specifying unit is one of a selecting unit that selects an appropriate installation position pattern from a plurality of installation position patterns indicating the installation position of the photoelectric power generating unit on the projection plane and a position shooting unit that captures an image of the photoelectric power generating unit on the projection plane to thereby acquire the installation position of the photoelectric power generating unit.

7. The projection system according to claim 1, wherein
the driving unit is an operation position detecting unit that detects an operation position at which an operation is performed on an image on the projection plane, wherein
the photoelectric power generating unit supplies the generated power to the operation position detecting unit.

8. A projection apparatus used with a sensor device, the sensor device being installed at a predetermined position in an area in which an image is projected on a projection plane and including a photoelectric power generating unit that generates power corresponding to an intensity of a projection light of the image projected at the predetermined position, the projection apparatus comprising:
a projecting unit that projects an image onto the projection plane; and
an image processing unit that converts at least image data to be projected at an installation position of the photoelectric power generating unit into white image data or converts a whole frame of the image data, wherein
the sensor device includes a driving unit that operates by using the power generated by the photoelectric power generating unit.

9. A sensor device used with a projection apparatus, the projection apparatus being configured to project an image onto a projection plane, wherein
the sensor device is installed at a predetermined position in an area in which the image is projected on the projection plane, and
the sensor device comprises:
a photoelectric power generating unit that generates power corresponding to an intensity of a projection light projected by a projecting unit; and
a driving unit that operates by using the power generated by the photoelectric power generating unit.

10. The sensor device according to claim 9, wherein the driving unit is an operation position detecting unit that detects an operation position at which an operation is performed on an image on the projection plane.

* * * * *